(12) United States Patent
Eckhart et al.

(10) Patent No.: US 9,010,796 B2
(45) Date of Patent: Apr. 21, 2015

(54) ADJUSTABLE PINTLE MOUNT ADAPTER BRACKET

(75) Inventors: James A. Eckhart, Westlake Village, CA (US); Victor H. Grande, Pacoima, CA (US)

(73) Assignee: Diapa Info Inc., Westlake Village, CA (US)

( * ) Notice: Subject to any disclaimer, the term of this patent is extended or adjusted under 35 U.S.C. 154(b) by 889 days.

(21) Appl. No.: 13/232,706

(22) Filed: Sep. 14, 2011

(65) Prior Publication Data

US 2012/0085884 A1    Apr. 12, 2012

Related U.S. Application Data

(60) Provisional application No. 61/390,749, filed on Oct. 7, 2010.

(51) Int. Cl.
| | |
|---|---|
| *B60D 1/60* | (2006.01) |
| *B60D 1/02* | (2006.01) |
| *B60D 1/24* | (2006.01) |
| *B60D 1/46* | (2006.01) |

(52) U.S. Cl.
CPC ...... *B60D 1/02* (2013.01); *B60D 1/247* (2013.01); *B60D 1/46* (2013.01)

(58) Field of Classification Search
CPC ............. B60D 1/02; B60D 1/247; B60D 1/46
USPC ......... 248/416.1, 416.2, 477, 490.1, 507, 515
See application file for complete search history.

(56) References Cited

U.S. PATENT DOCUMENTS

| | | | | |
|---|---|---|---|---|
| 4,033,601 | A * | 7/1977 | Lindahl et al. | 280/490.1 |
| 4,783,094 | A * | 11/1988 | Sands | 280/515 |
| 6,575,488 | B2 * | 6/2003 | Massey | 280/490.1 |
| 6,862,904 | B1 * | 3/2005 | Hubbart | 70/14 |
| 7,909,350 | B1 * | 3/2011 | Landry | 280/479.2 |
| 8,333,402 | B2 * | 12/2012 | Moore, Jr. | 280/477 |
| 2007/0108732 | A1 * | 5/2007 | Silva, II | 280/507 |
| 2009/0085327 | A1 * | 4/2009 | Bachman et al. | 280/507 |
| 2009/0188082 | A1 * | 7/2009 | Huang | 16/382 |

\* cited by examiner

*Primary Examiner* — Gwendolyn W. Baxter

(57) ABSTRACT

The Adjustable Pintle Mount Adapter Bracket is a device capable of attaching a pintle and a weight distribution shank at varying heights. The pintle and weight distribution shank are attached on opposite sides of the bracket. The unique adjustability of the design is accomplished through a series of holes and easily removable pins which thread through the holes in the bracket and the weight distribution shank. The invention comprises of a series of components which are combined through welding.

17 Claims, 8 Drawing Sheets

ADJUSTABLE PINTLE MOUNT ADAPTER BRACKET

The current application claims a priority to the U.S. Provisional Patent application Ser. No. 61/390,749 filed on Oct. 7, 2010.

FIELD OF THE INVENTION

The present invention relates generally to an adjustable pintle mount. More particularly, the present invention is an apparatus for mounting a pintle towing device onto an adapter bracket, which can be mounted to any standard weight distribution shank without the use of tools.

BACKGROUND OF THE INVENTION

A typical pintle mount is a flat plate mount on which a pintle hitch is positioned and secured. A pintle is a pin or hook on which other parts are able to pivot. A towing hitch is a device used to connect one end of a vehicle to that of another vehicle. By connecting the two ends of two separate vehicles, the vehicle in front is able to tow the vehicle behind. The pintle serves to secure the hitch onto a mounting plate, allowing the hitch to pivot. A typical pintle mount comprises a rigid, welded arm that extends from the receiver hitch of the tow vehicle. The pintle is attached to the pintle mount, which may have more than one set of mounting holes, with bolts. To change the height to match a particular trailer, the mounting bolts must be removed and the pintle must be reattached to the pintle mount at the proper height setting and then the bolts must be properly retightened. Typical pintle mounts lack the ability to adjust the height of the pintle and hitch system without the use of special tools which are not always readily available in the field. The present invention provides an adjustable pintle hitch mount that can accommodate to the difference in height between the ends of two vehicles without tools and in a quick amount of time.

DETAIL DESCRIPTIONS OF THE INVENTION

All illustrations of the drawings are for the purpose of describing selected versions of the present invention and are not intended to limit the scope of the present invention.

Figure 1:
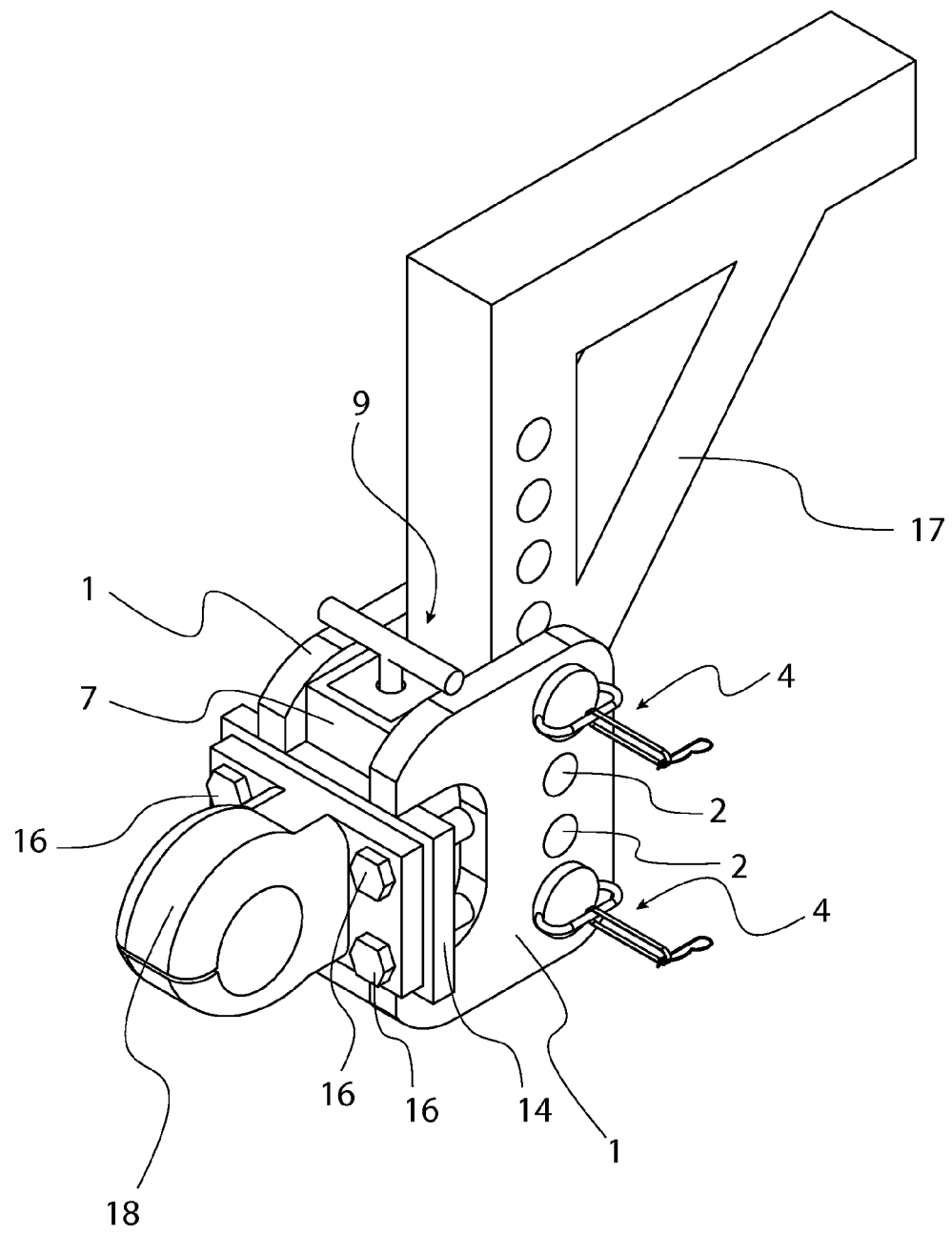
FIG. 1 is a perspective view of the invention.
Figure 2:
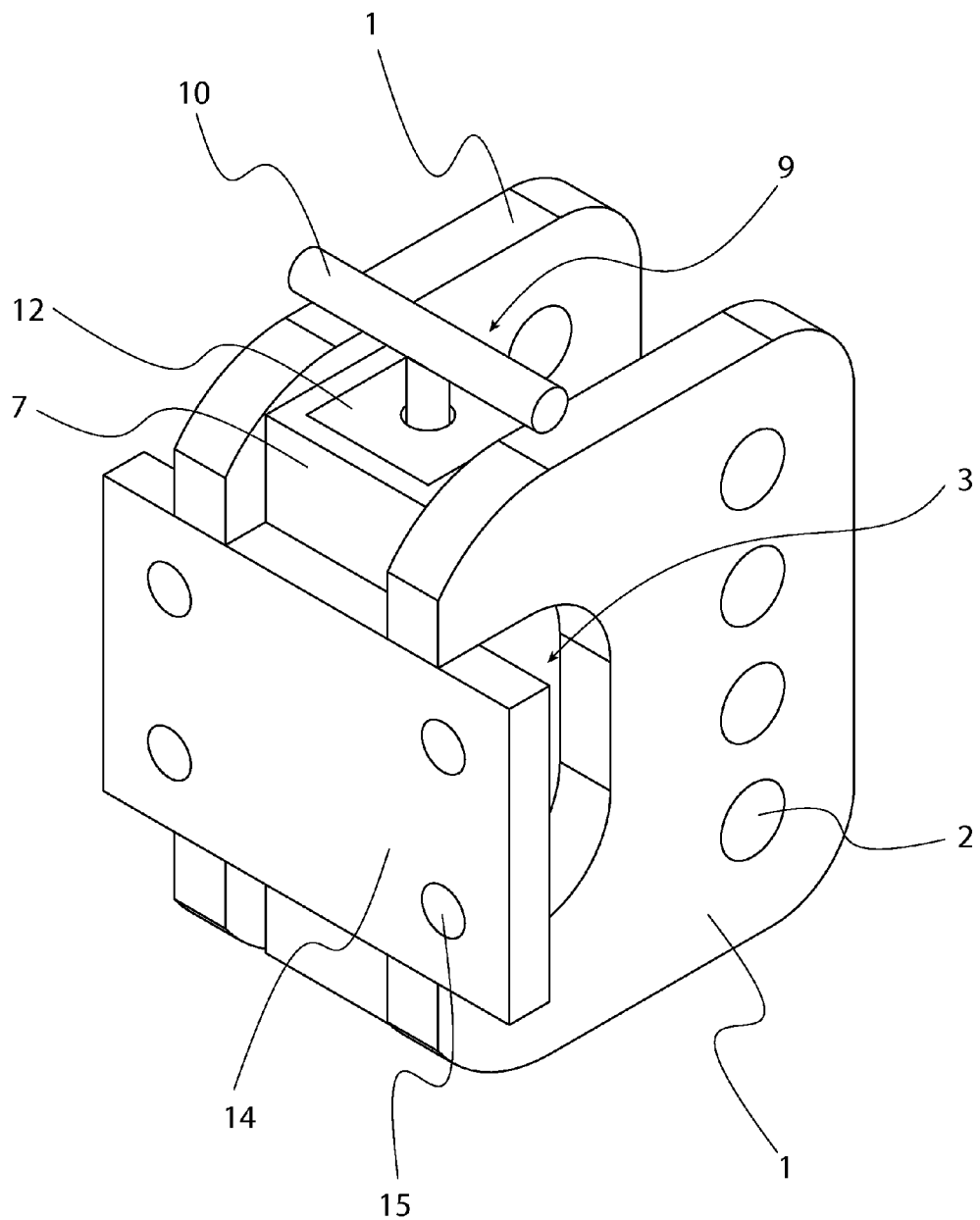
FIG. 2 is a perspective view of the invention with a mounted pintle and weight distribution device.
Figure 3:
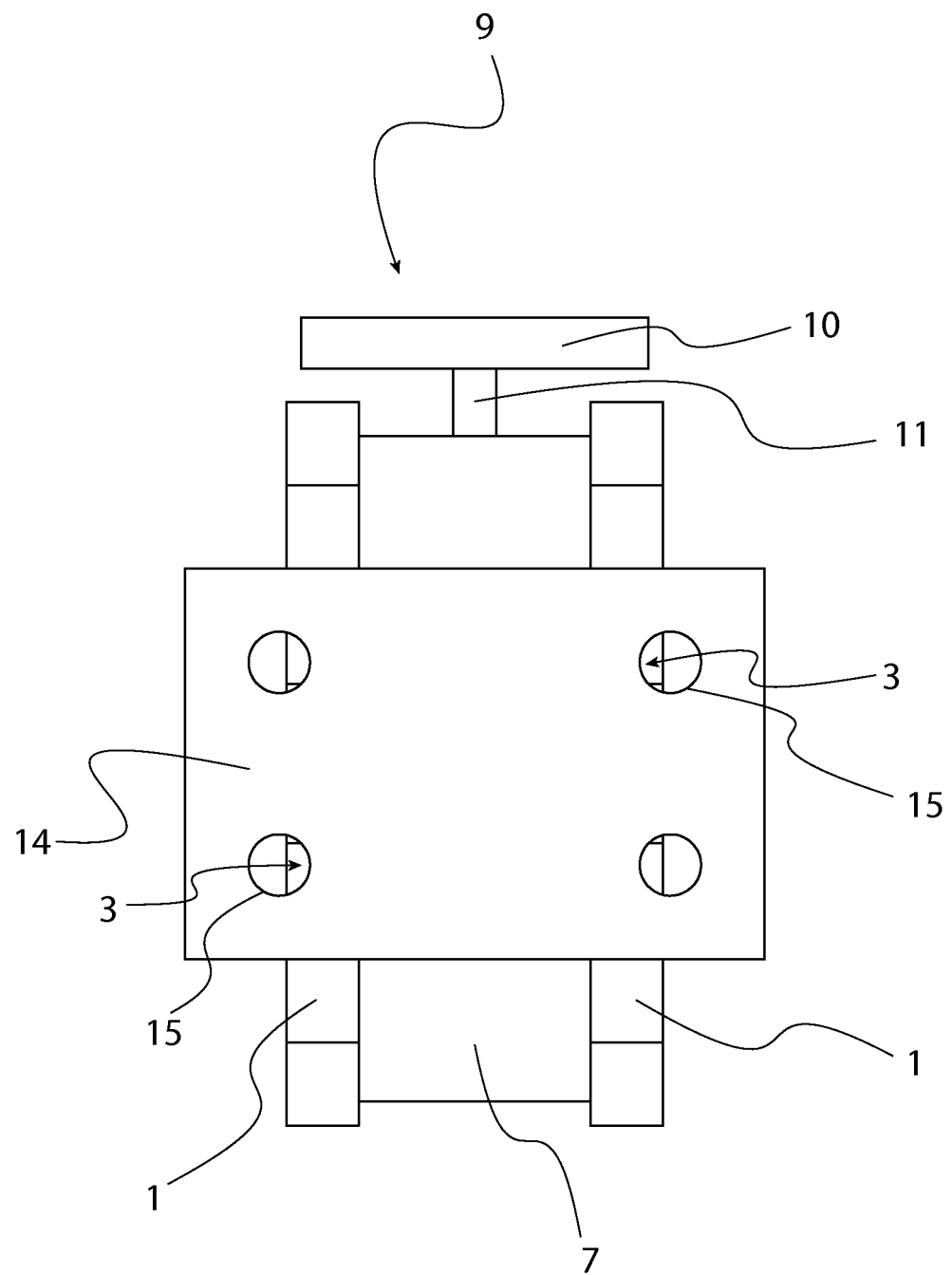
FIG. 3 is a front view of the invention.
Figure 4:
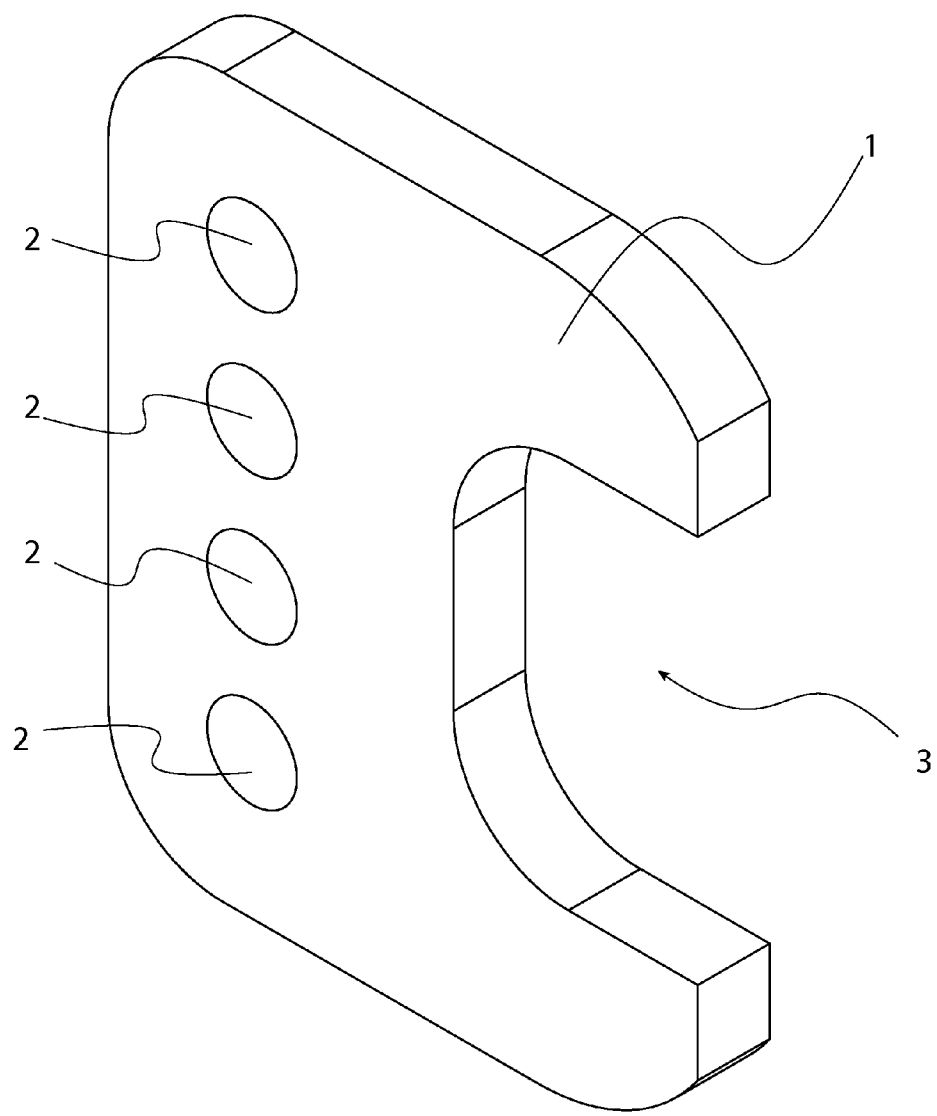
FIG. 4 is a perspective view of a side plate.

Referring to FIG. 1 and FIG. 2, the present invention is a device capable of mounting a pintle 18 type towing device and an industry standard weight distribution shank 17. The invention also features tool less height adjustability for the weight distribution shank 17. The overall structure of the invention is a steel bracket comprising of a plurality of side plates 1, a plurality of pins 4, a tube spacer 7, a handle assembly 9, and a mounting plate 14. The various components are interlocked together through welding.

Figure 8:
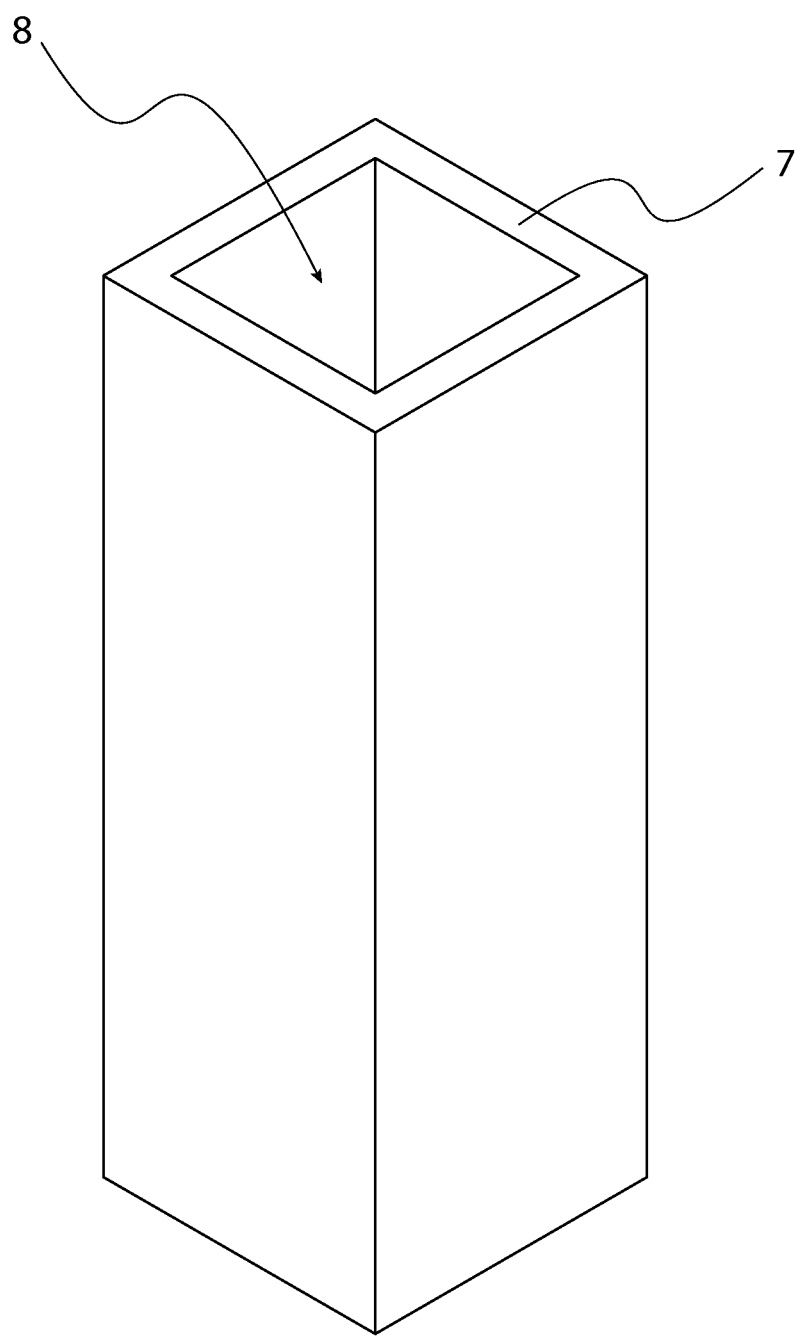
FIG. 8 is a perspective view of the tube spacer.

In reference to FIG. 1, FIG. 2 and FIG. 8, the tube spacer 7 is centrally located in the invention with many of the components being affixed to one of its surfaces. The tube spacer 7 is a hollow rectangular prism, with the hollow portion creating the handle cavity 8. The handle cavity 8 provides an area for the handle assembly 10 to be housed when it is fully mounted to the invention. The weight distribution shank 17 is placed in the open space behind the tube spacer 7 and in between the side plates 1.

In reference to FIG. 1, FIG. 2, FIG. 4, and FIG. 5, the plurality of side plates 1 comprises of a plurality of pin holes 2 and a plurality of bolt cavities 3. The bolt cavities 3 are relief cut outs from the surface of the side plates 1. The pin holes 2 are evenly spaced by 1¼" and have a diameter of ¾" and accommodate the pins 4. In the current design, two side plates 1 are used, and are manufactured from ⅝" thick steel. The thickness is necessary to create a structure capable of withstanding loading during towing and other high stress scenarios. The two side plates 1 are attached on opposite sides of the tube spacer 7, such that they are parallel to each other with the weight distribution device 17 in between them. The parallel orientation of the side plates 1 lines up the plurality of pin holes 2 on each of the side plates 1 such that the pins 4 can thread through both of the plates 1 and the holes in the weight distribution device 17. Since the holes 2 are spaced vertically, the weight distribution 17 device can be moved up or down and secured in any of the holes 2. This gives users the ability to adjust the height of the shank 17 depending on the height of the vehicle the device is being attached to.

Figure 5:
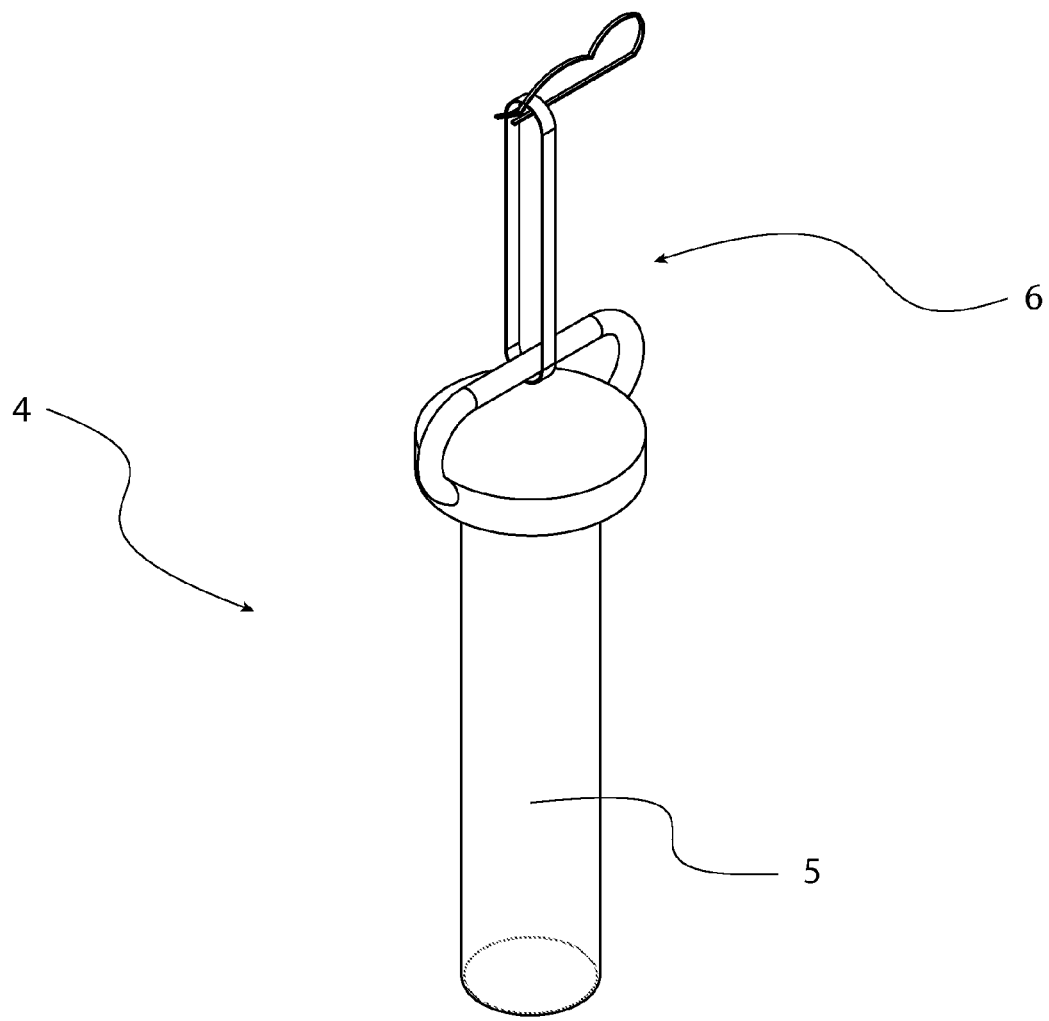
FIG. 5 is a perspective view of a pin.
Figure 6:
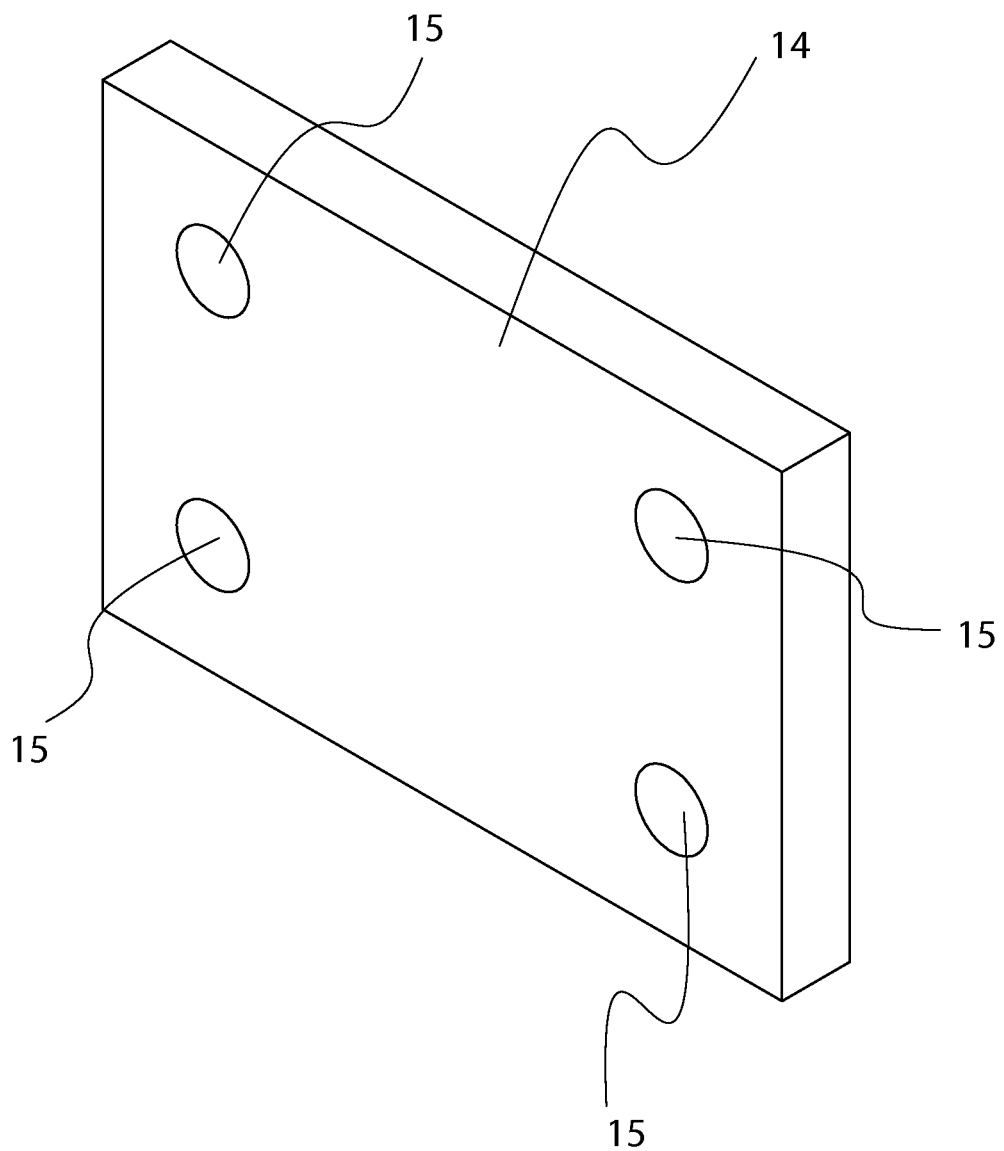
FIG. 6 is a perspective view of the mounting plate.

In reference to FIG. 2 and FIG. 5, the pins 4 have a diameter of ¾" to match the plurality of pin holes 2 and holes along the weight distribution shank 17. In the current design, the pins 2 have a length of 4" so that they are long enough to span the distance in between the two side plates 1 to ensure that the weight distribution shank 17 is fastened tightly. The pins 4 are manufactured from high strength steel in order to secure the weight distribution device 17 with confidence. The pins 4 comprise of a pin shaft 5, and a grip 6. The shaft 5 being the portion of the pin 4 which is threaded through both the pin holes 2 and the holes of the weight distribution shank 17 in order to hold the shank 17 in place. The grip 6 allows users to grasp and remove the pins 4 from the holes 2 without tools. The grip 6 consists of a lanyard and hair pin cotter pins. The lanyard attaches the hair pin cotter pins to the shaft 5. The lanyard and hair pin cotter pins are easy and comfortable to hold. The grip 6 provides an interface for the user to pull out the pins 4 through the sole use of their bare hands. This tool less design makes removing the pins 4 extremely convenient and intuitive. Users are able to quickly change the position of the pins 4, adjust the height of the shank 17, or remove the shank 17 from the bracket.

In reference to FIG. 1, FIG. 2, FIG. 3, and FIG. 6, the side plates 1 are also attached to the mounting plate 14, with the mounting plate 14 creating a perpendicular angle with the side plates 1. The mounting plate 14 is also attached to the front surface of the tube spacer 7. The mounting plate 14 is rectangularly shaped and comprises of a plurality of mounting holes 15. In the current design, there are four mounting holes 15, with each mounting hole 15 located near one of the corners using a 1¾"×3⅜" bolt pattern, a commonly used pattern for towing devices. The mounting plate 15 is half an inch thick and when welded together with other components capable of bracing the pintle 18. The mounting holes 15 are aligned such that they are in front of the bolt cavities 3, creating ample clearance for the bolts 16 to go when mounting the pintle 18. To mount the pintle 18, four standard bolts 16 are used which securely fasten the pintle 18 to the front surface of the mounting plate 14. The unique design of the side plates 1 and bolt cavities 3 also create a welding area which locks the side plates 1, the mounting plate 14, and the tube spacer 7 together. When welded together, this strong connection is designed to withstand high loads, and the towing capacity of the invention is not limited by the bracket, but by the other towing components such as the pintle 18 and strength of the weight distribution shank 17.

Figure 7:
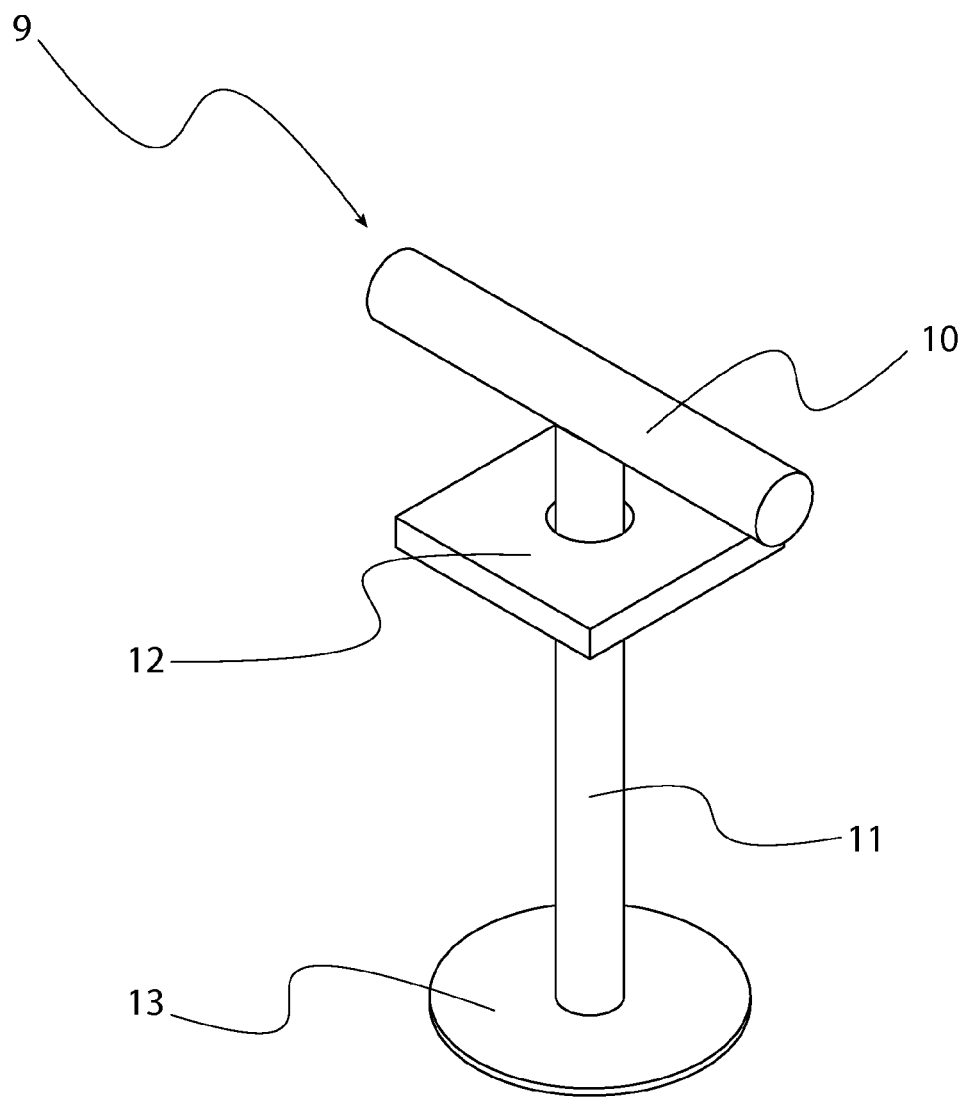
FIG. 7 is a perspective view of the handle assembly.

In reference to FIG. 1, FIG. 7, and FIG. 8, in the current design, the average weight of the invention is approximately 30 pounds, due to the large amount of steel required to create the durable bracket. The heavy weight of the invention might be a concern to some users, however, to help reduce the effects of the weight, a handling mechanism has been devised. A telescoping handle assembly 2 has been incorporated into the design. The handle assembly 9 has a T-shape design and comprises of a handle 10, a shaft 11, a safety piece 13, and a plate piece 12. The handle 10 is mounted on top of the shaft 11, and the two components are perpendicular to each other, forming the T. The handle 10 and shaft 11 are manufactured from ⅜" steel rods. The size of the rods is small enough to not add a significant weight to the design, but large enough to provide a sufficient handle assembly 9 for the user to grip. Positioned around the shaft 11 is a plate piece 12, with a hole slightly larger than the shaft 11 diameter, this allows the handle to slide smoothly through the rectangular plate piece 12. At the base of the shaft 11 is a safety piece 13, a short cylinder with a diameter larger than the shaft 11. This safety piece 13 restricts the movement of the shaft 11 by contacting the plate piece 12 when the handle 10 is pulled up. The handle assembly 9 is attached to the bracket by welding the plate piece 12 onto the top of the tube spacer 7. This aligns the handle assembly 9 with the handle cavity 8, allowing the handle assembly 9 to retract into the cavity 8 when it is not in use. This feature gives the invention a compact feel, and reduces the chance the handle assembly 9 could interfere with the operation of the device. When the handle assembly 9 is being used, the shaft 11 becomes exposed from the cavity 8 as the user pulls up on the handle 10, however, the shaft 11 cannot completely exit the cavity 8 because the safety piece 13 will contact the plate piece 12 and prevent the handle assembly 9 from completely detaching from the bracket. The handle assembly 9 is designed to be used with one hand, leaving the other hand free to balance the bracket and place in the pins 4.

In reference to FIG. 1 and FIG. 2, the listed components create a functional Adjustable Pintle Mount Adaptor Bracket able to mount a pintle 18 and weight distribution shank 17. While the invention has been described in its preferred embodiment, it is to be understood that a variety of possible modifications can be made to fulfill the purposes of the invention. It is intended that the present invention cover all other embodiments that are within the scope of the appended claims and their equivalents.

What is claimed is:

1. An Adjustable Pintle Mount Adapter Bracket comprises,
   a plurality of side plates;
   a handle assembly;
   a mounting plate;
   a tube spacer;
   a plurality of pins;
   the plurality of side plates comprises of a plurality of pin holes and a plurality of boltcavities;
   the tube spacer comprises of a handle cavity;
   the handle assembly comprises of a handle, a shaft, a safety piece, and a plate piece;
   the plurality of side plates being affixed on opposite sides of the tube spacer;
   the plurality of pins being fit into the plurality of pin holes;
   the mounting plate being affixed on front of the tube spacer;
   the mounting plate being attached to the tube spacer perpendicular to the plurality of side plates;
   the plate piece being in between the handle and the safety piece along the shaft;
   the shaft sliding through the plate piece;
   the plate piece being affixed on top of the tube spacer;
   the shaft and the safety piece fitting into the handle cavity; and
   the plurality of side plates, the handle assembly, the mounting plate, and the tube spacer being welded together.

2. The Adjustable Pintle Mount Adapter Bracket as claimed in claim 1 comprises,
   the plurality of pin holes being evenly spaced;
   the plurality of bolt cavities being recessed cut outs; and
   the plurality of side plates being parallel to each other.

3. The Adjustable Pintle Mount Adapter Bracket as claimed in claim 2 comprises,
   the mounting plate comprising of a plurality of mounting holes;
   the mounting plate being rectangularly shaped; and
   the plurality of bolt cavities being located behind the mounting holes.

4. The Adjustable Pintle Mount Adapter Bracket as claimed in claim 2 comprises,
   a handle cavity being hollow;
   the tube spacer being centrally positioned; and
   the tube spacer being affixed in between the plurality of side plates.

5. The Adjustable Pintle Mount Adapter Bracket as claimed in claim 1 comprises,
   the plurality of pins comprises of a pin shaft, and a grip;
   the pin shaft being cylindrically shaped; and
   the grip being attached to the shaft.

6. The Adjustable Pintle Mount Adapter Bracket as claimed in claim 1 comprises,
   the shaft, the handle, and the safety piece being cylindrically shaped;
   the safety piece being attached on bottom of the shaft;
   the safety piece being of larger diameter than the shaft;
   the handle being attached on top of the shaft; and
   the handle being perpendicular to the shaft.

7. An Adjustable Pintle Mount Adapter Bracket comprises,
   a plurality of side plates;
   a handle assembly;
   a mounting plate;
   a tube spacer;
   a plurality of pins;
   the plurality of side plates comprises of a plurality of pin holes and a plurality of boltcavities;
   the plurality of pins comprises of a pin shaft, and a grip;
   the mounting plate comprising of a plurality of mounting holes;
   the tube spacer comprises of a handle cavity;
   the handle assembly comprises of a handle, a shaft, a safety piece, and a plate piece;
   the plurality of side plates being affixed on opposite sides of the tube spacer;
   the pin shaft being cylindrically shaped;
   the grip being attached to the shaft;
   the plurality of pins being fit into the plurality of pin holes;
   the mounting plate being affixed on front of the tube spacer;
   the mounting plate being attached to the tube spacer perpendicular to the plurality of side plates;
   the plate piece being in between the handle and the safety piece along the shaft;
   the shaft sliding through the plate piece;

the plate piece being affixed on top of the tube spacer;

the shaft and the safety piece fitting into the handle cavity; and the plurality of side plates, the handle assembly, the mounting plate, and the tube spacer being welded together.

8. The Adjustable Pintle Mount Adapter Bracket as claimed in claim 7 comprises, the plurality of pin holes being evenly spaced;

the plurality of bolt cavities being recessed cut outs; and the plurality of side plates being parallel to each other.

9. The Adjustable Pintle Mount Adapter Bracket as claimed in claim 8 comprises, the mounting plate being rectangularly shaped; and the plurality of bolt cavities being located behind the mounting holes.

10. The Adjustable Pintle Mount Adapter Bracket as claimed in claim 8 comprises, a handle cavity being hollow;

the tube spacer being centrally positioned; and the tube spacer being affixed in between the plurality of side plates.

11. The Adjustable Pintle Mount Adapter Bracket as claimed in claim 7 comprises, the shaft, the handle, and the safety piece being cylindrically shaped;

the safety piece being attached on bottom of the shaft;

the safety piece being of larger diameter than the shaft;

the handle being attached on top of the shaft; and the handle being perpendicular to the shaft.

12. An Adjustable Pintle Mount Adapter Bracket comprises, a plurality of side plates;

a handle assembly;

a mounting plate;

a tube spacer;

a plurality of pins;

the plurality of side plates comprises of a plurality of pin holes and a plurality of boltcavities;

the plurality of pins comprises of a pin shaft, and a grip;

the mounting plate comprising of a plurality of mounting holes;

the tube spacer comprises of a handle cavity;

the handle assembly comprises of a handle, a shaft, a safety piece, and a plate piece;

the plurality of side plates being affixed on opposite sides of the tube spacer;

the plurality of pins being fit into the plurality of pin holes;

the mounting plate being affixed on front of the tube spacer;

the mounting plate being attached to the tube spacer perpendicular to the plurality of side plates;

the plate piece being in between the handle and the safety piece along the shaft;

the shaft sliding through the plate piece;

the plate piece being affixed on top of the tube spacer;

the shaft and the safety piece fitting into the handle cavity; and the plurality of side plates, the handle assembly, the mounting plate, and the tube spacer being welded together.

13. The Adjustable Pintle Mount Adapter Bracket as claimed in claim 12 comprises, the plurality of pin holes being evenly spaced;

the plurality of bolt cavities being recessed cut outs; and the plurality of side plates being parallel to each other.

14. The Adjustable Pintle Mount Adapter Bracket as claimed in claim 13 comprises, the mounting plate being rectangularly shaped; and the plurality of bolt cavities being located behind the mounting holes.

15. The Adjustable Pintle Mount Adapter Bracket as claimed in claim 13 comprises, a handle cavity being hollow;

the tube spacer being centrally positioned; and the tube spacer being affixed in between the plurality of side plates.

16. The Adjustable Pintle Mount Adapter Bracket as claimed in claim 12 comprises, the pin shaft being cylindrically shaped; and the grip being attached to the shaft.

17. The Adjustable Pintle Mount Adapter Bracket as claimed in claim 12 comprises, the shaft, the handle, and the safety piece being cylindrically shaped;

the safety piece being attached on bottom of the shaft;

the safety piece being of larger diameter than the shaft;

the handle being attached on top of the shaft; and the handle being perpendicular to the shaft.

\* \* \* \* \*